United States Patent [19]

Hung et al.

[11] Patent Number: 5,545,693
[45] Date of Patent: Aug. 13, 1996

[54] NITRILE CONTAINING PERFLUOROPOLYETHER-PERFLUOROELASTOMER BLENDS

[75] Inventors: Ming-Hong Hung, Wilmington, Del.; Mureo Kaku, Kawasaki, Japan; Anestis L. Logothetis, Wilmington, Del.

[73] Assignee: E. I. Du Pont de Nemours and Company, Wilmington, Del.

[21] Appl. No.: 401,830

[22] Filed: Mar. 10, 1995

[51] Int. Cl.$^6$ .............................. C08L 27/18; C08L 27/12
[52] U.S. Cl. ...................... 525/187; 525/186; 524/208; 528/402
[58] Field of Search ..................... 525/186, 187; 524/208, 368; 528/402

[56] References Cited

U.S. PATENT DOCUMENTS

| 3,317,484 | 5/1967 | Fritz et al. | 260/78.4 |
|---|---|---|---|
| 4,356,291 | 10/1982 | Darling | 528/402 |
| 4,413,094 | 11/1983 | Aufdermarsh, Jr. | 525/187 |

FOREIGN PATENT DOCUMENTS 193349  8/1989  Japan.

OTHER PUBLICATIONS

Soloski, E. J. et al, "Synthesis of Perfluoro(Polyether) Difunctional Compounds", *Journal of Flourine Chemistry*, 11, 601–612 (1978).

Evers, R. C. et al, "Hydrolytically Stable Fluorocarbon Ether Bibenzoxazole Polymers", *J. of Polymer Sci.: Poly. Chem. Edition*, 19, 427–442 (1981).

*Primary Examiner*—David Buttner

[57] ABSTRACT

Blends of a perfluoroelastomer with a nitrile containing polyperfluoroether are described. The addition of the polyperfluoroether often improves the properties, processability and/or low temperature properties of the perfluoroelastomer. It is preferred if the perfluoroelastomer contains nitrile groups so that the two polymers can cocure, thereby retarding separation of the polyperfluoroether from the perfluoroelastomer.

21 Claims, No Drawings

NITRILE CONTAINING PERFLUOROPOLYETHER-PERFLUOROELASTOMER BLENDS

FIELD OF THE INVENTION

This invention concerns blends of vinyl addition perfluoroelastomers with low molecular weight perfluoropolyethers which have nitrile end groups. The ethers act as plasticizers for the perfluoroelastomers.

TECHNICAL BACKGROUND

Perfluoroelastomers are items of commerce, used for instance when a rubber with excellent heat and/or chemical resistance is needed. Thus they are used for seals of various types such as o-rings and gaskets, in tubing, and as tank linings.

However this type of elastomer often is difficult to process and/or has poor low temperature properties (becomes stiff or brittle at lower temperatures). One sought after improvement for these elastomers has been a material which acts as a plasticizer to improve processing properties and/or low temperature properties. Such materials have been difficult to find, since the "plasticizer" should preferably be stable at the high temperatures to which the perfluoroelastomer may be exposed to in use, and should also not bleed (become separated from) the perfluoroelastomer, particularly after the perfluoroelastomer is crosslinked.

R. C. Evers, et al., J. Polym. Sci., Polym. Chem. Ed., vol. 19, p. 427–442 (1981) and E. J. Soloski, et al., J. Fluorine Chem., vol. 11, p. 601–612 (1978) describe the synthesis of polyperfluoroethers with nitrile end groups. These materials are described as being useful as intermediates for the preparation of higher molecular weight polymers.

U.S. Pat. No. 4,413,094 describes blends of tetrafluoroethylene/perfluoro(methyl vinyl ether)/nitrile containing copolymers with higher molecular weight poly(hexafluoropropylene oxide) (polyHFPO). The polyHFPO contains nitrile groups which are introduced by random copolymerization of a nitrile containing monomer when the polyHFPO are made, and therefore the nitrile groups are randomly distributed along the polyHFPO chain. No mention is made of polyperfluoroethers with nitrile end groups.

SUMMARY OF THE INVENTION

This invention concerns, a composition, comprising, a vinyl addition perfluoroelastomer and a polyperfluoroether of the formula

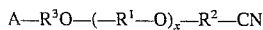

A—R³O—(—R¹—O)$_x$—R²—CN wherein:

A is fluorine or nitrile;

each R¹ is independently perfluoroalkylene containing 1 to 3 carbon atoms;

R² is perfluoroalkylene containing 1 to 3 carbon atoms;

R³ is perfluoroalkylene containing 1 to 3 carbon atoms; and x is about 8 to about 75.

DETAILS OF THE INVENTION

The perfluoroelastomer used herein is termed a "vinyl addition perfluoroelastomer". By "vinyl addition perfluoroelastomer" is meant that the perfluoroelastomer contains repeat units which may be derived from ethylene or various vinyl monomers or their equivalents. Thus, useful vinyl monomers include perfluorinated olefins such as tetrafluoroethylene and hexafluoropropylene, and perfluorinated alkyl vinyl ethers such as perfluoro(methyl vinyl ether) and perfluoro(propyl vinyl ether). Such perfluoroelastomers may also be formed by, for instance, polymerization of unfluorinated or partially fluorinated vinyl monomers (and ethylene), and subsequent perfluorination of the polymer, as by elemental fluorine, see for instance U.S. Pat. No. 4,948,844, which is incorporated herein by reference.

Preferred perfluoroelastomers are those which are copolymers of tetrafluoroethylene (TFE), or equivalents thereof such as polymers made from ethylene or partially fluorinated ethylene and are subsequently fluorinated. An especially preferred perfluoroelastomers is a copolymer of TFE with a perfluoro(alkyl vinyl ether) (or equivalents thereof) in which the alkyl group contains 1 to 5 carbon atoms, and is preferably perfluoro(methyl vinyl ether), and optionally a curesite monomer.

The perfluoroelastomer may also contain cure sites (as part of a repeat unit), i.e., functional groups attached to the polymer which (optionally with curing agents) allow the polymer to be crosslinked when desired. A preferred cure site is the nitrile group, and a preferred perfluoroelastomer contains nitrile groups (see below). It is preferred that the cure site monomer is about 0.1 to about 5 mole percent of the repeat units in the perfluoroelastomer. A preferred curesite monomer is perfluoro(8-cyano-5-methyl-3,6-dioxa-1-octene).

The other essential ingredient of the claimed composition is a polymer of the formula A—R³O—(—R¹—O)$_x$—R²—CN, wherein A, R¹, R², R³, and x are as defined above. Essentially this polymer is a perfluoropolyether which has one or two nitrile end groups. By an end group is meant that the nitrile group(s) is (are) attached to the polymer in the vicinity of the end of the polymer chain. The groups R¹, R², R³ are perfluoroalkylene groups. By perfluoroalkylene herein is meant a divalent group containing only carbon and fluorine. The open bonds of the divalent group may be to the same or different carbon atoms. The synthesis of such nitrile containing polymers is described in R. C. Evers, et al., J. Polym. Sci., Polym. Chem. Ed., vol. 19, p. 427–442 (1981) and E. J. Soloski, et al., J. Fluorine Chem., vol. 11, p. 601–612 (1978), and in some of the Experiments herein.

In preferred perfluoropolyethers R¹ is one or more of —CF$_2$—, —CF$_2$CF$_2$— or —CF(CF$_3$)CF$_2$—, and it is especially preferred that R¹ is —CF(CF$_3$)CF$_2$—. It is also preferred that when R¹ is —CF(CF$_3$)CF$_2$—: R² is —CF(CF$_3$)—; when A is nitrile R³ —CF$_2$CF$_2$—, and when A is fluorine R³ is —(CF$_2$)$_3$—. It is also preferred that x is about 10 to about 60, and more preferred that x is about 10 to about 50. It is also pointed out that the value of x is an average (which can be determined by gel permeation chromatography using appropriate standards), since the molecules in such polymers normally have a range of distribution of molecular weights.

It is preferred if the major portion (by weight) of the composition is the perfluoroelastomer, and it is more preferred if the composition contains about 70 to about 98% by weight of perfluoroelastomer. These weight proportions refer to the relative percentages of the perfluoroelastomer and perfluoropolyether in the composition, and do not include other ingredients which may be present.

It is believed the addition of the perfluoropolyether to the perfluoroelastomer may improve the processability of the perfluoroelastomer and/or improve the low temperature properties of the perfluoroelastomer. By "improves the processability" is meant that during preparation of the perfluoroelastomer for eventual crosslinking, mixing and shaping operations are more easily carried out. By "improves the low temperature properties" is meant that the perfluoroelastomer may be used at lower temperatures in a given use. It is believed that the relatively low molecular weight of the polyperfluoroether herein is a particular advantage in improving the processability of the perfluoroelastomer.

In a preferred embodiment of this invention, when the perfluoroelastomer is crosslinked, the perfluoropolyether also becomes part of the crosslinked network, i.e., the perfluoropolyether become covalently bonded to the crosslinked perfluoroelastomer. As mentioned in U.S. Pat. No. 4,413,094 at col. 2, line 62 to col. 3, line 4, polyHFPO and the perfluoroelastomers used therein tend to separate from each other unless covalently bonded to each other. The nitrile group of the perfluoropolyether is a site which can react to become bound to the perfluoroelastomer, particularly when the perfluoroelastomer itself contains nitrile groups, thereby preventing such separation.

It is therefore preferred that as high a percentage of the perfluoropolyether molecules as possible have at least one nitrile group, so that it can become part of the crosslinked network. When nitrile groups are deliberately placed on one or both ends of the perfluoropolyether one is assured that a high percentage of the perfluoropolyether molecules can so react. When there are two such nitrile end groups, the perfluoropolyether may become part of the crosslinked network (as opposed to just a branch), which is even more desirable. It is difficult to assure that in a random copolymer most or all of the polymer molecules will contain a curesite containing repeat unit which is present in small amounts, particularly when the average degree of polymerization (x) of the copolymer is relatively low.

The compositions herein may be in the crosslinked (cured) or uncrosslinked (uncured) states. For the crosslinking of nitrile containing perfluoroelastomers see for instance U.S. Pat. Nos. 4,281,092, 4,394,489 and U.S. application No. 08/230,026, filed Apr. 19, 1994 (CR-9504). The compositions may also contain other materials such as (reinforcing) fillers such as carbon black, curing agems, curing catalysts, pigments, fibers, etc.

In the Examples and Experiments, the following abbreviations are used:

E1 - $C_3F_7OCFHCF_3$

Fomblin®Z DEAL - $MeOOCCF_2—(OCF_2CF_2)_q—(OCF_2)_s—OCF_2COOMe$ (available from Ausimont, USA)

Freon® 113 - 1,1,2-trichloro-1,2,2-trifluoroethane

HFP - hexafluoropropylene

HFPO - hexafluoropropylene oxide

MAE - $CH_3OOCCF_2CF_2OCF(CF_3)COF$

EXPERIMENTS 1 AND 2

These experiments illustrate how to prepare dinitriles (mononitriles can be prepared by analogous methods using a monofunctional perfluoropolyether) in which $R^1$ is $—CF(CF_3)CF_2—$, $R^2$ is $—CF(CF_3)—$, and $R^3$ is $—CF_2CF_2—$, and x is about 9 (Experiment 1) or about 29 (Experiment 2). In Experiment 1 only the preparation of the acyl fluoride capped perfluoropolyether is described. Conversion to the dinitrile is analogous to the method described in Experiment 2.

EXPERIMENT 1

(i) Initiator Solution for Polymerization

The monoadduct ester (MAE) 86.96 g was added into 1 liter flask that contained 41.01 g (0.27 mol) of CsF (cesium fluoride) and 300 g of tetraglyme. The solution was stirred overnight. Insoluble solid (1.99 g) was removed after ultracentrifugation of solution. This solution was used as initiator for the polymerization of hexafluoropropene oxide (HFPO).

(ii) Polymerization Procedure

All the initiator solution shown above was used for this experiment. First, the initiator solution was cooled to −29.5° to −32° C. To the polymerizer, 120 g of hexafluoropropene (HFP) was added in the period of 20.25 hours. HFP was functioned as solvent as well as fluoride scavenger to prevent chain transfer reaction. After the first addition of HFP, the polymerizer was kept at −30° to −35° C. and 224 g of HFPO was slowly added to the reactor (57.5 hours). It was followed by a second addition of HFP (93.8 g in 8.75 h) and a second addition of HFPO, (93.3 g in 14.5 hours) followed by a third addition of HFP (36 g in 2.7 h) and a third addition of HFPO (93.7 g in 18 h). Total of 411 g of HFPO and 249.8 g of HFP were used for this polymerization. Agitation of polymerizer was continued for another 20 hours to complete the polymerization. 40 mL of methanol was added to quench the reaction and convert the chain ends to a secondary ester. The reaction mixture was washed by another 200 mL of methanol then dilute by 200 mL of Freon®-113. The solution was washed with 200 mL of water three times and then dried over anhydrous sodium sulfate. The solids were removed by filtration. The; Freon®-113 removed from the liquid phase by evaporation to give a 407 g of a transparent high boiling liquid. The yield was 93.7%. From $^{19}F$-NMR, the, degree of polymerization (DP) was calculated as 9.6 (theoretical, DP=10) and the purity of difunctionality was almost 100% (no peak at −130.4 ppm was observed).

EXPERIMENT 2

(1) Initiator solution

The method used to prepare the initiator solution was the same as described in above. The solution used for the polymerization of high molecular weight HFPO contained 19.88 g (0.0617 mol) of MAE, 8.47 g of cesium fluoride and 17.08 g of tetraglyme.

(2) Polymerization

The condition of polymerization was the same as described in above. The order of the addition of HFP and HFPO are as following:

| Step | HFP (g) | HFPO (g) | Time (hours) |
| --- | --- | --- | --- |
| 1 | 199.3 | | 24 |
| 2 | | 95.1 | 74 |
| 3 | 222.8 | | 24 |
| 4 | | 147 | 90 |
| 5 | 100.0 | | 7.7 |
| 6 | | 153.2 | 111.5 |
| 7 | 32.5 | | 5.5 |
| 8 | | 96.5 | 68 |
| Total | 554.6 | 491.8 | |

The reaction was continued 3 hours after the last addition of HFPO was completed. Anhydrous methanol (40 mL) was added into the polymerizer to convert the polymer chain end to ester. The cool bath was then removed and the reaction mixture was warmed to room temperature. The polymeric material was obtained (251 g) as a clear liquid.

(3) Reaction with Ammonia

Freon®-113 (110 mL) was added into the above material, the flask cooled to −10° C. and 16 g of ammonia was slowly introduced to the flask while the contents were stirred. After the reaction was complete another 200 mL of Freon®-113 was added. The insoluble brown colored solids formed during the reaction were removed by filtration. The yield of the difunctional amide was 196.9 g, after removing the solvent. Completion of reaction was confirmed by IR (disappearance of the peak at 1800 cm$^{-1}$ and appearance of an amide peak at 1740 cm$^{-1}$).

(4) Difunctional poly(HFPO) Dinitrile

The difunctionl poly(HFPO) diamide (196.7 g) was disolved in 500 mL of Freon®-113 cooled to below 0° C. and 23.52 g of pyridine was added to the mixture. Trifluoroacetic anhydride (31.34 g) was added slowly and with good stirring keeping the solution at below 0° C. The solid pyridium trifluoroacetic acid salt precipitated during the reaction and was removed by filtration. The filtered solution was washed with 100 mL of ether 5 times and the Freon®-113 layer was separated and all volatiles evaporated to leave behind a 142.94 g of difuncfional poly(HFPO) nitrite. (IR showed no amide peaks at 1740 cm$^{-1}$ but showed a strong nitrile peak at 2265 cm$^{-1}$) The degree of polymerization was 29.3 and the content of difunctional polymer was higher than 93%.

EXPERIMENT 3

This experiment illustrates the preparation of a dinitrile from a commercially available perfluoropolyether diester.

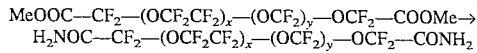

Fomblin®-Z DEAL (Mw~2200±200) (110 g, 0.05 mol) was dissolved in 1,1,2-trichloro-1,2,2-trifluoroethane (F-113) (125 mL) and cooled to −10° C. Ammonia gas (17 g, 1.0 mol) was slowly bubbled into the solution through a gas inlet tube, and the reaction temperature was controlled at below 15° C. After the addition was complete, the reaction mixture was stirred at ambient temperature for one hour. After washing the product with diluted HCl and water, the F-113 solvent was removed in vacuo, and the residue was dried under high vacuum (1 mm Hg) overnight. The diamide product was obtained as a semi-transparent viscous liquid (101 g). Infrared spectrum indicated that the absorption at 1800 cm$^{-1}$ (COOMe) had completely disappeared and a new peak at 1740 cm$^{-1}$ (—CONH$_2$) was observed. $^{19}$F NMR (188.24 MHz, CFC$_3$): −51.8 (m), −52.0 (s, br), −53.6 (s, br), −55.4 (s, br) [—OCF$_2$O—]; −88.7 (s, br), 88.8 (s, br), −90.7 (s, br) [—OCF$_2$CF$_2$O—]; −79.1 (m, br), −80.9 (m, br) [—CF$_2$—CONH$_2$].

The same procedure as above was followed except that the F-113 solvent was replaced by E1 solvent. After same workup, ~103 to 105 g of the product was obtained but with better clanty.

The Preparation of Dicyano Perfluoroether:

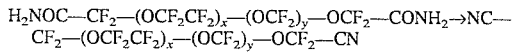

The diamide (104 g) was dissolved in E1 solvent (200 mL) at ambient temperature. Pyridine (12 g, 0.152 mol) and trifluoroacetic anhydride (21 g, 0.1 mol) were added slowly in sequence into the solution. The reaction mixture was stirred at 100° C. overnight (16–20 hr) and the solids formed after cooling were removed by filtration. The solution was washed with water, then with saturated sodium chloride aqueous solution, and the solvent was removed in vacuo. The residue was dried under high vacuum (1 mm Hg) to give almost quantitative yield of dicyano product as a slightly viscous liquid. Infrared spectrum indicated that the absorption at 1740 cm$^{-1}$ (CONH$_2$) had disappeared and a new peak at 2265 cm$^{-1}$ (—C≡N) was observed. $^{19}$F NMR (188.24 MHz, CFCl$_3$): −52.0 (s, br), −53.6 (s, br), −55.4 (s, br) [—OCF$_2$O—]; −88.7 (s, br), −88.8 (s, br), −90.7 (s, br) [—OCF$_2$CF$_2$O—]; −58.5 (m, br), −59.9 (s, br) [—CF$_2$—CN].

EXPERIMENT 4

The general polymerization conditions to prepare the above polymer are described in U.S. Pat. No. 4,281,092.

The polymerization was done in a 3800 mL mechanically stirred, water jacketed, stainless steel autoclave operated continuously at 70° C. and at a pressure of 4.1 MPa. Tetrafluoroethylene and perfluoro(methylvinyl ether) were pumped in at a rate of 250 and 300 g/hr respectively, by means of a diaphragm compressor. Perfluoro-(8-cyano-5-methyl-3,6-dioxa-1-octene) was fed neat at the rate of 11.3 g/hr (29 mmol/hr). Each of two aqueous redox initiator solutions were pumped in separately at the rate of 600 mL/hr. The peroxide initiator solution A was prepared by dissolving 85 g of ammonium persulfate, 50 g disodium hydrogen phosphate hepta-hydrate ,and 160 g ammonium perfluoroctanoate in 8 liters of deaerated distilled water. Initiator solution B was prepared by dissolving 70 g of sodium sulfite in 8 L of de-aerated distilled water. Polymer latex was continuously removed through a let down valve and unreacted monomers were vented. Over a period of 6 hrs 10.1 kg latex was collected.

The latex coagulated by adding it to a solution consisting of 382 g magnesium sulfate hexahydrate in 10 liters of water and heated to 90° C. The coagulated polymer was filtered, washed repeatedly with warm water and the wet crumb was dried at 70° C. for 48 h. The yield of the polymer was 2.25 kg and contained about 43 wt % of perfluoro(methylvinyl ether) and 2.2 wt % of perfluoro-( 8-cyano-5-methyl-3,6 dioxa-1-octene) and had an inherent viscosity of 0.7 dl/g (measured in a solution containing 0.1 g of polymer per 100 g of solvent consisting of a 60/40/3 volume ratio of hepta-fluoro-2,2,3-trichlorobutane, perfluoro(butyltetrahydrofuran) and ethylene glycol dimethyl ether.

EXPERIMENT 5

The general conditions for the preparation of this polymer are described in U.S. Pat. No. 4,983,697.

The polymer was prepared in a 1 liter mechanicall stirred, water-jacketed, stainless-steel autoclave operated continuously at 85° C. and 4.8 MPa pressure into which was pumped at a rate of 275 mL/hr an aqueous polymerization medium/initiator comprising of 16 liters of water, 55 g ammonium persulfate, 471 g disodium hydrogen phosphate heptahydrate and 141 g ammonium perfluorooctanoate ("Fluorad" FC-143, 3M Co.). At the same time another aqueous solution comprising of 16 L of water and 141 g of ammonium perfluorooctanoate was also pumped in at a rate of 275 mL/hr. A solution comprising of 67.25 g of perfluoro-(8-cyano-5-methyl-3,6-dioxa-1-octene) and 2.5 g of 1,4-diiodoperfluorobutane were pumped at a rate of 4.35 g/hr.

By means of a diaphragm compressor a gaseous mixture of tetrafluoroethylene (113 g/hr) and perfluoro(methylvinyl ether) (130 g/hr) was fed simultaneously at a constant rate.

Polymer latex was removed by means of a let down valve and unreacted monomers were vented. The latex from 14 hrs of operation was added with stirring to a preheated (90°–95° C.) coagulating solution consisting of 1840 g magnesium sulfate heptahydrate in 40 liters of water. The coagulated crumb polymer was filtered, washed repeatedly with water and dried by heating in an 80° C. air oven for 48 hrs. The dried polymer weighed 2700 g and had the following composition: 45.2 wt % perfluoro(methyl vinyl ether), 2.25 wt % perfluoro-(8-cyano-5-methyl-3,6-dioxa-1-octene), 0.05 wt % iodine, and inherent viscosity 0.43 dl/g as measured according to Experiment 4.

EXPERIMENT 6

The polymer was prepared as in Experiment 5 except the 1,4-diiodoperfluorobutane was omitted from the recipe. The polymer had the following composition: 42.3 wt % perfluoro(methyl vinyl ether), 2.4 perfluoro-(8-cyano-5-methyl-3,6-dioxa-1-octene) and inherent viscsosity 0.52 dl/g as measured according to Experiment 4.

EXAMPLES 1–3

A masterbatch was made by mixing the polymer of Experiment 4 on a 2-roll high shear rubber mill at 70°–80° C. with 12 phr SAF black, 0.3 phr 18-crown- 6 and 3 phr tetraphenyl tin. The masterbatch was divided into three portions and further milled with dicyanoperfluoroether (from Experiment 3) and non-funtional polyHFPO polyether as shown below:

TABLE 1

| Examples | 1 | 2 | 3 |
|---|---|---|---|
| Masterbatch | 115.3 | 115.3 | 115.3 |
| Dicyanoperfluoropolyether (Experiment 3) | — | 4 | — |
| Krytox ® 16350 (polyHFPO) | — | — | 4 |
| As-214 O-rings were shaped at 190° C./30 mins and post-cured in an oven at 305° C./42 h which was blanketed in an atmosphere of nitrogen. | | | |
| Tensile strength, psi | 1406 | 1355 | 1165 |
| Elongation, % | 131 | 141 | 142 |
| Comp. Set 205° C./70 h | 32 | 37 | 34 |
| Heat Aged at 300° C./72 h | | | |
| Tensile strength, psi | 2236 | 2031 | 1746 |
| Elongation, % | 215 | 205 | 198 |
| Comp. set 204° C./70 h | 27 | 26 | 43 |

The compression set values in Examples 1–3 are very similar when measured after post-curing (32, 37, 34 respectively). However, upon heat aging in air at 330° C./74 h, Example 3 which contains Krytox® 16350 that has no functionality, loses a considerable amount of compression set resistance (from 34 goes to 43) while Examples 1 and 2 gain in compression set resistance (from 32, 37 go to 37 and 26 respectively). In addition Krytox® 16350 bleeded to the surface of the specimen and appeared ,as an oily film (Example 3 ) while Examples 1 and 2 showed no oil on the surface.

EXAMPLE 4

The formulation was made by mixing the polymer of Experiment 5 with 10 phr MT black, 4 phr dicyanoperfluoropolyether (from Experiment 3) and 2 phr of triphenyl tin hydroxide on a 2-roll high shear rubber mill at 60°–70° C. AS-214 O-rings were made on a press at 190° C./30 mins and post-cured at 305° C./42 hrs in an atmosphere of nitrogen. The properties were, tensile strength 1607 psi, elongation 198% and compression set measured at 204° C./70 h was 31. After heat aging the O-rings at 275° C./72 h the compression sets improved giving a value of 24.

EXAMPLE 5

The formulation was made by mixing the polymer of Example 2 with 10 phr MT black, 4 phr dicyanoperfluoropolyether (from Experiment 3), 2 phr triphenyl tin hydroxide,1 phr triallyl isocyanurate and 1 phr Luperco 101XL peroxide (Lubrizol Co). AS-214 O-rings were made in a press at 190° C./30 mins and post-cured at 305° C./42 hrs in an atmosphere of nitrogen. The O-rings had tensile strength of 1788 psi, elongation of 153%, compression set at 204° C./70 hrs of 32. Upon heat aging in air at 275° C./72 hrs the compression set value was 21.

EXAMPLE 6 AND 7

On a 2-roll high shear mill the following formulations were made. AS-214 O-rings were pressed at 190° C./30 rains and post-cured at 305° C./42 hrs in nitrogen. The results are given below:

| Example | 6 | 7 |
|---|---|---|
| Polymer Experiment 4 | 100 | — |
| Polymer Experiment 5 | — | 100 |
| SAF black | 20 | 20 |
| Luperco 101 XL | 5 | 5 |
| Triallyl isocyanurate | 3 | 3 |
| DinitrilePolyHFPO (Experiment 2) | 20 | 20 |
| Tensile Properties | | |
| Tb, psi | 1315 | 1064 |
| Eb, % | 87 | 87 |
| Comp. sets 204° C./70 h | | |
| O-rings | 64 | 63 |

EXAMPLE 8

On a 2-roll mill a formulation was made using polymer of Experiment 5 with 30 phr MT black, 4 phr dicyanopeffluoropolyether (from Experiment 3), 2 phr triphenyl tin hydroxide, 1 phr of triallyl isocyanurate and 1 phr Luperco 101 XL peroxide. AS-214 O-rings were made at 175° C./30 mins and post-cured at 305° C./42 hrs in an atmosphere of nitrogen. The properties were:

| Tensilestrength, psi | 1951 |
|---|---|
| Elongation, % | 114 |
| Comp. set at 204° C./70 h | 29 |
| After heat aging in air at 275° C./14 days | |
| Tensile strength, psi | 1950 |
| Elongation, % | 145 |

EXAMPLES 9, 10 AND 11

A masterbatch was made by mixing the polymer of Experiment 6 on a 2-roll high shear rubbermill at 60°–70° C. with 20 phr MT black, 2.0 phr zinc oxide, 1 phr tetraphenyl tin hydroxide, 1 phr triallylisocyanurate and 1 phr Luperco 101 XL peroxide. The masterbatch was divided into three portions and further milled with dicyanoperfluoroether (Experiment 3) and Krytox® 16350 (which is a non-functional polyHFPO polyether) as shown below:

| Examples | 9 | 10 | 11 |
|---|---|---|---|
| Masterbatch | 125 | 125 | 125 |
| Dicyanoperfluoropolyether (from Experiment 3) | 5 | — | — |
| Krytox® 16350 (polyHFPO) | — | 5 | — |
| ODR 177° C./3° Arc Minimum, in-lbs. | 3 | 7 | 8 |

AS-214 O-rings were molded at 190° C./30 mins and post-cured in an oven at 305° C./42 h which was blanketed in an atmosphere of nitrogen.

| Tensile strength, psi | 1585 | 1580 | 1758 |
|---|---|---|---|
| Elongation, % | 182 | 209 | 193 |
| Comp. Set 205° C./70 hr | 46 | 46 | 49 |

The dicyanoperfluoroether lowers the viscosity of the compounds as shown in the ODR minimum Torque values of Example 9 versus Examples 10 (with Krytox® 16350) or in Example 11 which has no plasticizer at all. All other physical properties are similar.

EXAMPLES 12, 13 AND 14

The masterbatch was made by mixing the polymer of experiment 5 on a 2-roll high shear rubber mill at 60°–70° C., 2.0 phr zinc oxide, 1 phr tetraphenyl tin hydroxide, 1 phr triallylisocyanurate and 1 phr Luperco 101 XL peroxide. The masterbatch was divided into three portions and further milled with dicyanoperfluoroether (Experiment 3) and Krytox® 16350 which is a nonfunctional polyHFPO polyether as shown below:

| | Example | | |
|---|---|---|---|
| | 12 | 13 | 14 |
| Masterbatch | 104 | 104 | 104 |
| Dicyanoperfluoropolyether (from Experiment 3) | 2 | — | — |
| Krytox® 16350 (polyHFPO) | — | 2 | — |
| ODR 177° C./3° Arc | | | |
| Minimum, in-lbs | 6 | 8 | 8 |
| Maximum, in-lbs | 30 | 30 | 30 |
| Mooney Scorch 121° C. | | | |
| Minimum | 39 | 54 | 4 |

AS-214 0-rings were molded at 190° C./30 mins. and post-cured in an oven at 305° C./42 h which was blanketed in an atmosphere of nitrogen.

| Comp. Set 205° C./70 h | 46 | 46 | 49 |
|---|---|---|---|

The dicyanoperfluoroether lowers the viscosity of the compounds as shown in the ODR minimum Torque and Mooney Scorch values of Example 12 versus Examples 13 (with Krytox® 16350) or in Example 14 with no plasticizer at all. All the other physical properties are similar.

EXAMPLES 15 AND 16

A masterbatch was made by mixing the polymer of Experiment 5 on a 2-roll high shear rubber mill at 70°–80° C., 20 phr of MT black and 2 phr tetraphenyl tin hydroxide. The masterbatch was further milled with dicyanoperfluoroether (Experiment 3) and Krytox® 16350 as shown below:

| | Example | |
|---|---|---|
| | 15 | 16 |
| Masterbatch | 122 | 122 |
| Dicyanoperfluoropolyether (from Experiment 3) | 4 | — |
| Krytox® 16350 (polyHFPO) | — | 4 |
| ODR 177° C./3° Arc | | |
| Minimum, in-lbs | 4.5 | 9.5 |
| Minimum, in-lbs | 25 | 23 |
| Mooney Scorch 121° C. | | |
| Minimum | 36 | 75 |

AS-214 O-rings were molded at 190° C./30 mins. and post-cured in an oven at 305° C./42 h which was blanketed in an atmosphere of nitrogen.

| Compression set 204° C./70 h | 31 | 31 |
|---|---|---|
| Heat Aged at 275° C./10 days | | |
| Compression set 204° C./70 h | 24 | 29 |

The dicyanoperfluoroether containing compound (Example 15) gives lower viscosities than Krytox® 16350 containing compound (Example 16) as indicated in ODR and Mooney Scorch minima. All other physical properties are similar. However, upon heat aging at 275° C. for 10 days the Krytox® 16350 has a tendency to bleed to the surface while the dicyanoperfluoropoluether does not. Also, upon heat aging at 275° C. for 10 days the compression set properties of Example 15 (contains dicyanoperfluoropolyether) get better while that of Example 16 (contains Krytox® 16350 polyHFPO) remain about the same indicating that the dicyanoperfluoropolyether becomes part of the network.

What is claimed is:

1. A composition, comprising, a vinyl addition perfluoroelastomer containing a nitrile curesite monomer and a polyperfluoroether of the formula $$A-R^3O-(-R^1-O)_x-R^2-CN$$

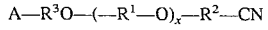

wherein:

A is fluorine or nitrile;

each $R^1$ is independently perfluoroalkylene containing 1 to 3 carbon atoms;

$R^2$ is perfluoroalkylene containing 1 to 3 carbon atoms;

$R^3$ is perfluoroalkylene containing 1 to 3 carbon atoms; and x is about 8 to about 75.

2. The composition as recited in claim 1 wherein x is about 10 to about 60.

3. The composition as recited in claim 1 wherein x is about 10 to about 50.

4. The composition as recited in claim 1 wherein A is nitrile.

5. The composition as recited in claim 1 wherein A is fluorine.

6. The composition as recited in claim 1 wherein R 1 is one or more of $-CF_2-$, $-CF_2CF_2-$ or $-CF(CF_2-$.

7. The composition as recited in claim 1 wherein $R^1$ is $-CF(CF_3)CF_2-$.

8. The composition as recited in claim 4 wherein $R^1$ is —CF(CF$_3$)CF$_2$—, $R^2$ is —CF(CF$_3$)—, and $R^3$ is —CF$_2$CF$_2$—.

9. The composition as recited in claim 5 wherein $R^1$ is —CF(CF$_3$)CF$_2$—, $R^2$ is —CF(CF$_3$)—, and $R^3$ is —(CF$_2$)$_3$—.

10. The composition as recited in claim 1 wherein said perfluoroelastomer is a copolymer of tetrafluoroethylene.

11. The composition as recited in claim 1 wherein said perfluoroelastomer is uncrosslinked.

12. The composition as recited in claim 1 wherein said perfluoroelastomer is a copolymer of tetrafluoroethylene and a perfluoro(alkyl vinyl ether) wherein said alkyl group contains 1 to 5 carbon atoms.

13. The composition as recited in claim 12 wherein said perfluoro(alkyl vinyl ether) is perfluoro(methyl vinyl ether).

14. The composition as recited in claim 1 wherein said perfluoroelastomer is a copolymer of tetrafluoroethylene and perfluoro(alkyl vinyl ether).

15. The composition as recited in claim 8 wherein said perfluoroelastomer is a copolymer of tetrafluoroethylene and a perfluoro(alkyl vinyl ether) wherein said alkyl group contains 1 to 5 carbon atoms.

16. The composition of claim 12 wherein the curesite monomer is about 0.1 to 5 mole percent of the repeat units in the composition.

17. The composition of claim 12 wherein the curesite monomer is perfluoro(8-cyano-5-methyl-3,6-dioxa-1-octene).

18. The composition of claim 15 wherein the curesite monomer is about 0.1 to 5 mole percent of the repeat units in the composition.

19. The composition of claim 15 wherein the curesite monomer is perfluoro(8-cyano-5omethyl-3,6-dioxa-1-octene).

20. The composition as recited in claim 1 wherein said perfluoroelastomer is crosslinked.

21. The composition as recited in claim 20 wherein said perfluoropolyether is covalently bonded to said perfluoroelastomer.

* * * * *